United States Patent [19]

Udo

[11] 4,249,721

[45] Feb. 10, 1981

[54] APPARATUS FOR PREHEATING MATERIAL TO BE CHARGED INTO STEEL MAKING EQUIPMENT

[75] Inventor: Eiji Udo, Nishinomiya, Japan

[73] Assignee: Nikko Industry Co., Ltd., Hyogo, Japan

[21] Appl. No.: 44,070

[22] Filed: May 31, 1979

[51] Int. Cl.³ .............................................. C21C 5/38
[52] U.S. Cl. ...................................... 266/156; 75/60; 75/61
[58] Field of Search ...................... 266/156; 75/60, 61

[56] References Cited

U.S. PATENT DOCUMENTS

| | | | |
|---|---|---|---|
| 3,231,369 | 1/1966 | Gorlich | 75/60 |
| 3,357,820 | 12/1967 | Rasworshegg | 75/60 |
| 3,998,626 | 12/1976 | Baum | 75/61 |

*Primary Examiner*—P. D. Rosenberg
*Attorney, Agent, or Firm*—Armstrong, Nikaido, Marmelstein & Kubovcik

[57] ABSTRACT

A preheating apparatus comprises a transfer duct connected to a dust collecting combustion chamber for steel making equipment, a hood fitting to the duct and shiftable to the position of one of preheating pits selectively, a bucket removably placed in each of the preheating pits and having an exhaust gas passage in its interior and openable bottom means at its bottom, and a communicating duct for holding each of the pits in communication with an outlet duct of the combustion chamber. The material to be charged into steel making equipment is placed into the bucket and preheated with exhaust gas from the combustion chamber. The apparatus assures savings in energy, improved safety and enhanced heat exchange efficiency.

7 Claims, 18 Drawing Figures

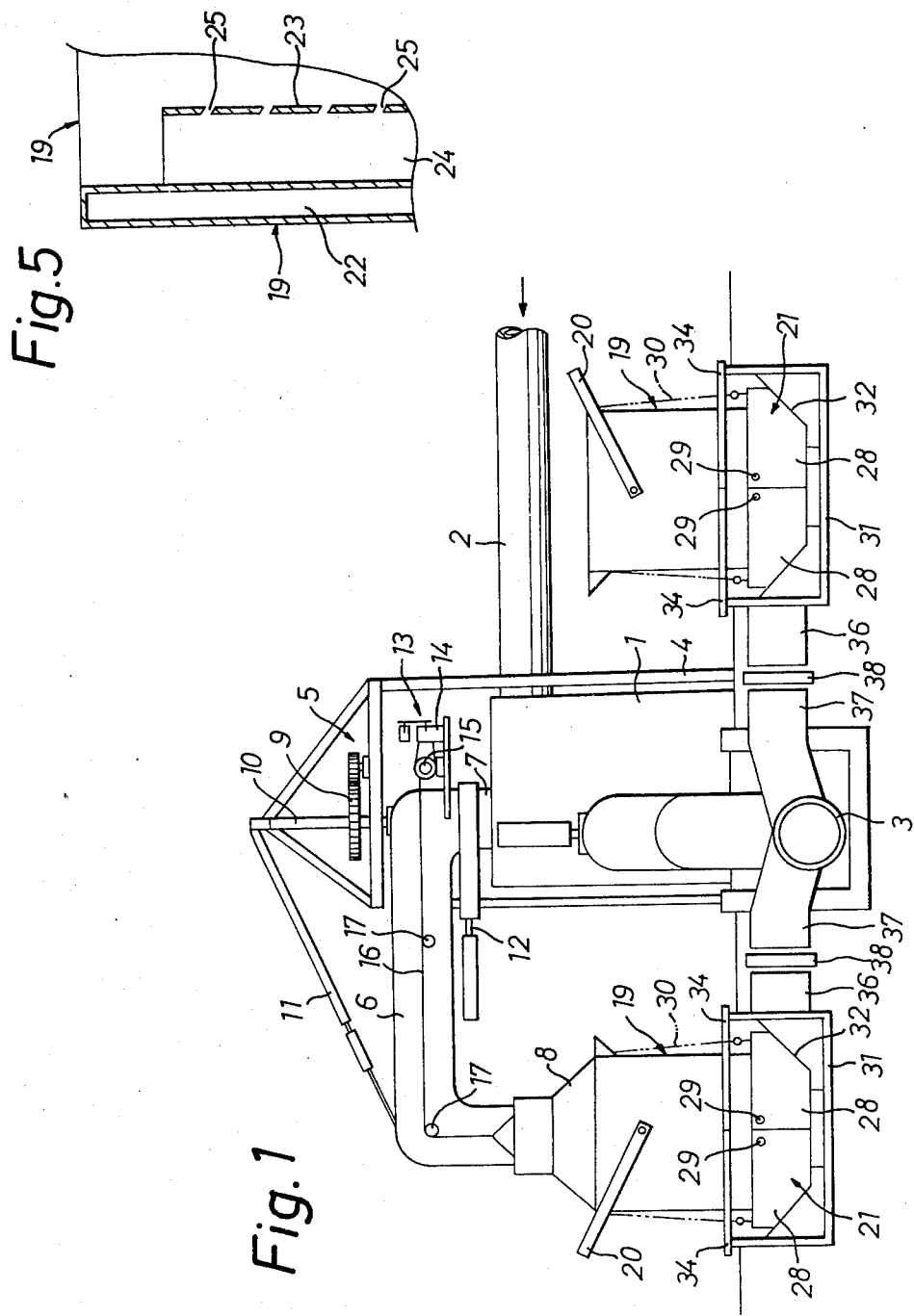

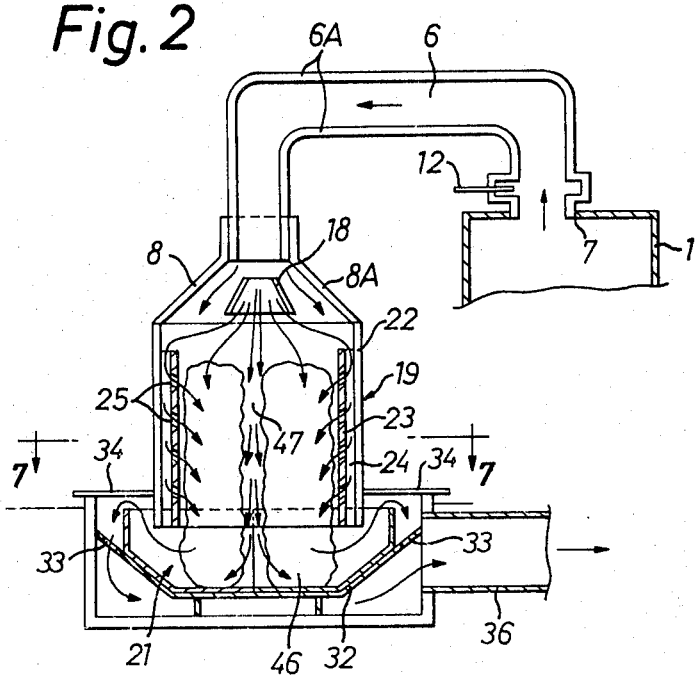
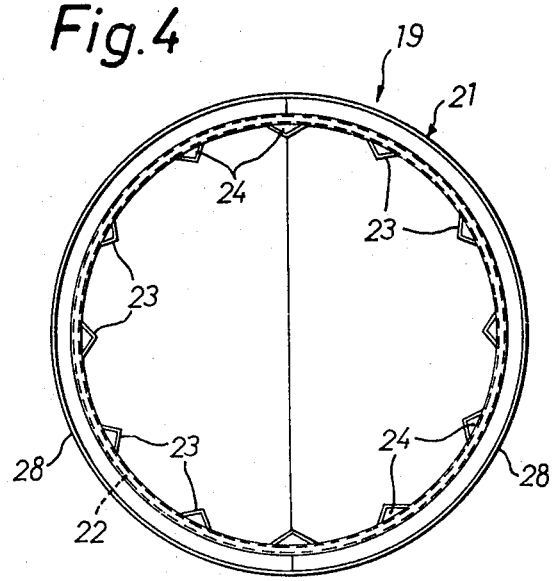

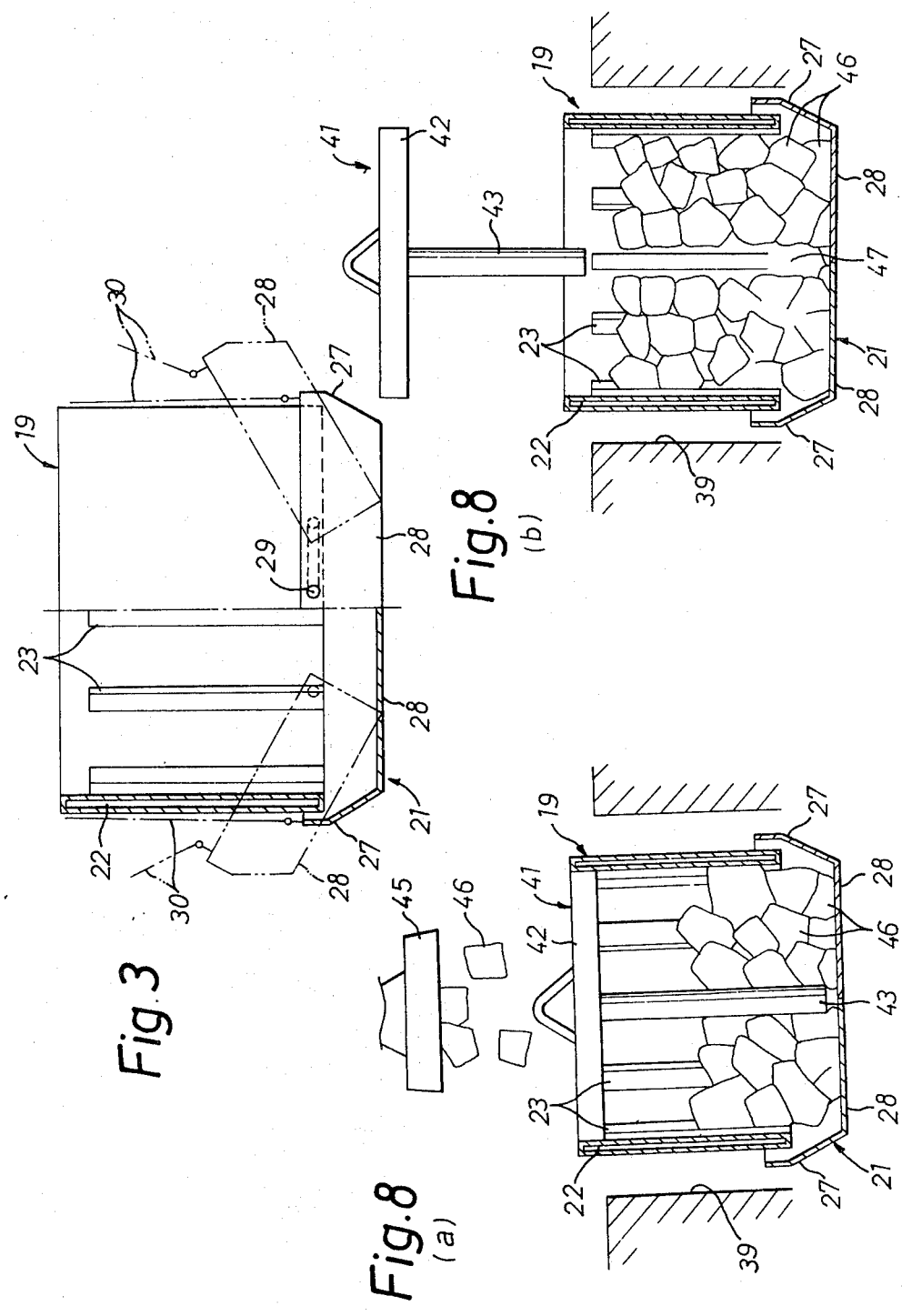

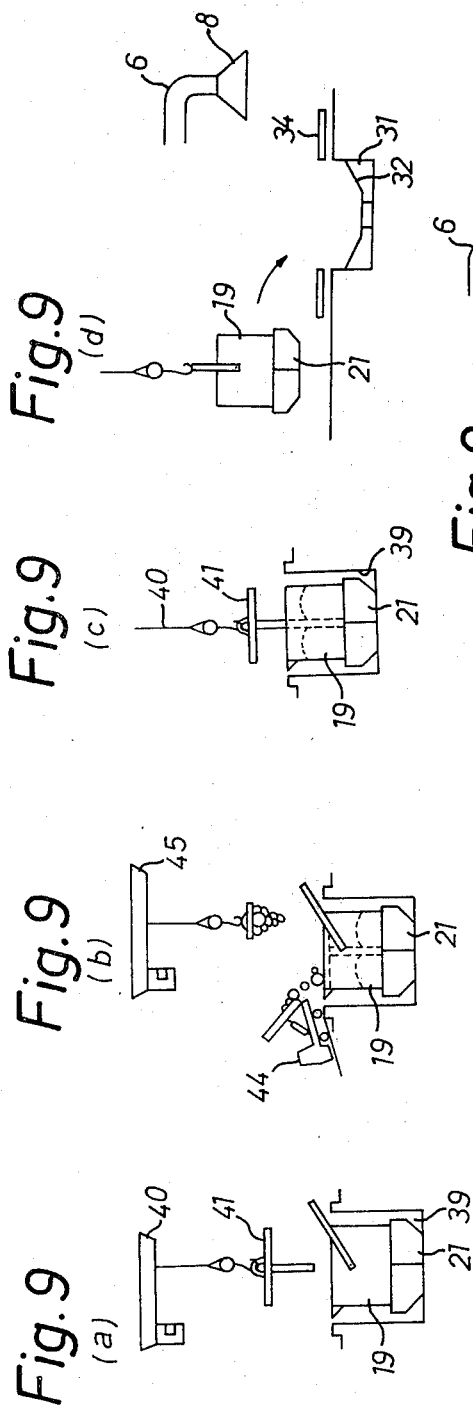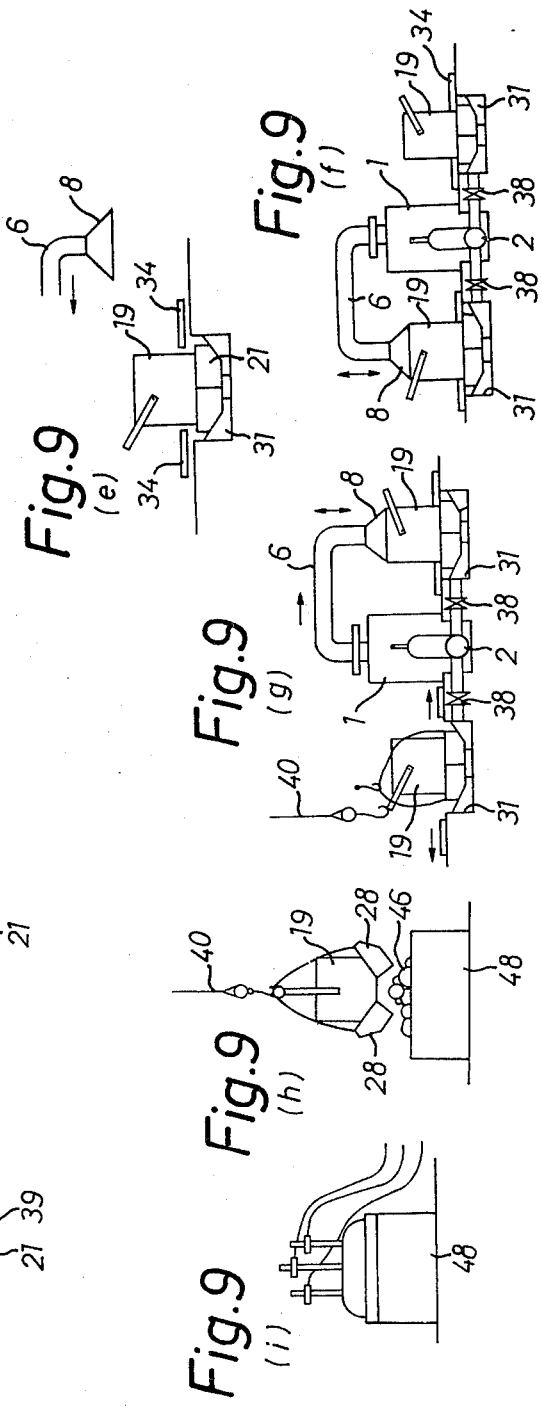

APPARATUS FOR PREHEATING MATERIAL TO BE CHARGED INTO STEEL MAKING EQUIPMENT

BACKGROUND OF THE INVENTION

This invention relates to an apparatus for preheating the material to be charged into steel making equipment.

In steel making processes, it is desirable to preheat materials such as scrap, alloy iron, directly reduced iron and lime before they are placed for example into an electric furnace.

Thus the steel making material is preheated to avoid a steam explosion accident when it is charged into the equipment for the safety of operation and to achieve an improved steel making efficiency by promoting melting of the material.

While auxiliary burners have heretofore been most widely used as means for preheating the material, such means are undesirable for the economical use of energy which is presently demanded. Accordingly a method has been introduced into use which utilizes an exhaust gas as recovered from a dust collector by which the gas generated in the furnace is forcibly withdrawn therefrom. This method nevertheless has the following drawbacks.

In addition to the basic problem that it is difficult to stabilize the pressure loss involved in the dust collector, it is impossible to adapt the method for the operation cycle of the highly advanced steel making process in which the melting time has been remarkably shortened. The known method requires the use of a large numer of buckets which, however, are serviceable only for a short period of time because they are placed directly into a preheating chamber, while such buckets must be provided with a lining or cooled with water.

Furthermore, scraps and like materials which are available in snowy or rainy districts contain large quantities of water and are prone to steam explosion accidents when charged into the equipment since it is difficult to fully dewater the materials. It is also important to provide a sealed structure for preventing heat losses.

SUMMARY OF THE INVENTION

An object of the present invention is to provide an apparatus for preheating the material to be charged into steel making equipment by which the heat energy of exhaust gas resulting from a steel making process is recovered from a combustion chamber through a bypass or transfer circuit and introduced into a charging bucket serving as a preheating chamber to thereby achieve savings in energy, improved productivity, enhanced safety and a remarkable cost reduction.

Another object of this invention is to provide a preheating apparatus of the type described in which the bypass circuit extending from the combustion chamber is in the form of a water-cooled duct and turnable, and the charging bucket is provided along its inner periphery and in its center with means for facilitating the flow of the exhaust gas and achieving a greatly improved heat exchange efficiency to prevent pressure losses, the bucket further being provided with a water-cooling jacket around its outer periphery for use with a high-temperature exhaust gas.

BRIEF DESCRIPTION OF THE DRAWINGS

FIG. 1 is an elevation showing an apparatus of this invention in its entirety;

FIG. 2 is a view showing the flow of exhaust gas;

FIG. 3 is a front view partly broken away and showing a charging bucket serving as a preheating chamber;

FIG. 4 is a plan view showing the bucket;

FIG. 5 is a fragmentary enlarged view in section showing the side wall of the bucket;

FIGS. 8 (a) and (b) are diagrams illustrating how to charge a material (scraps) into the bucket; and FIGS. 9 (a) to (i) are diagrams illustrating preheating steps.

DETAILED DESCRIPTION OF THE INVENTION

Figure 6:
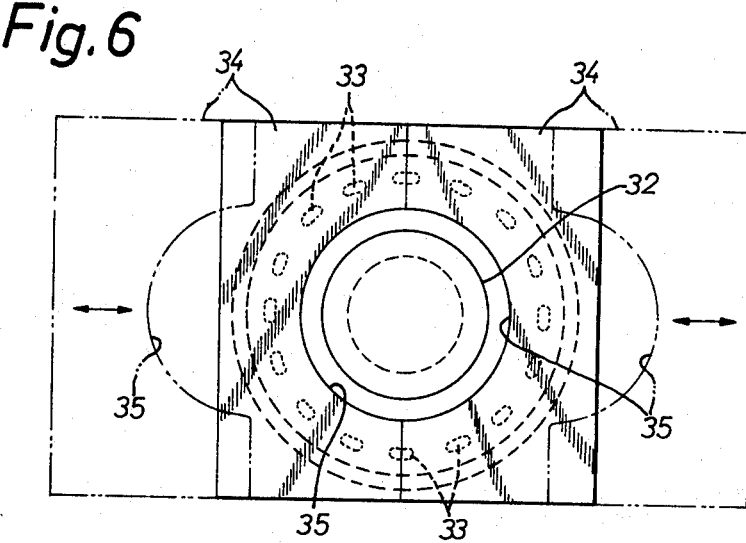
FIG. 6 is a schematic plan view showing a preheating pit.

With reference to FIG. 1 showing an overall arrangement of an existing electric furnace dust collector and an apparatus of the invention as attached to the dust collector, a combustion chamber 1 communicates with a water-cooled duct 2 connected to a side wall upper portion thereof and with another water-cooled duct 3 connected to a side wall lower portion thereof.

Exhaust gas from an unillustrated electric furnace is introduced into the combustion chamber 1 by way of unillustrated elbows, movable duct and the duct 2. Dust is led through the other water-cooled duct 3, unillustrated gas cooler, air-cooled duct, etc. into a baghouse (not shown) by a motor-driven blower.

The heat energy of the exhaust gas introduced into the dust collector is recovered and used by the apparatus of this invention for preheating materials such as scraps, directly reduced iron, alloy iron, etc.

As seen in FIG. 1, the combustion chamber 1 is surrounded by a frame 4, on the top of which there is a turning assembly 5 for reciprocally turning a bypass or transfer duct 6 about a vertical axis over the range of 180 degrees. According to the preferred embodiment shown in FIG. 2, the bypass duct 6 is in communication with an upper outlet 7 of the combustion chamber and is easily turnable, with consideration given so that large particles of duct will settle in the combustion chamber 1 to the greatest possible extent and will not ingress into the duct 6. The bypass duct 6 has a downwardly bent free end. A downwardly flared hood 8 is vertically movably fitted to the free end.

The turning assembly 5 includes a shaft 10 which is driven about its axis in a positive or negative direction by a motor through gear transmission means 9, whereby the bypass duct 6 is turned about the axis of the turning shaft 10. The shaft 10 is substantially in alignment with the outlet 7 vertically. The duct 6 is turnable over the range of 180 degrees. Indicated at 11 in FIG. 1 is a turning boom, the length of which is made variable with use of a turnbuckle or the like.

A hydraulically movable damper 12 is attached to the connection between the bypass duct 6 and the combustion chamber 1 to open or close the duct 6. The damper 12 thus positioned can be opened and closed free from the deposition of dust.

An assembly 13 for raising or lowering the hood 8 comprises a winch 15 disposed at the base end of the duct 6 and reversibly rotatable by an electric motor 14.

A wire 16, which is wound on the winch 15 and can be paid out, extends over a guide sheave 17 and is connected to the hood 8. In the illustrated embodiment, the hood 8 is raised when the wire 16 is wound up on the winch 15 and is lowered when the wire 16 is paid out.

With the preferred embodiment shown in FIG. 2, the bypass duct 6 and hood 8 are provided with water-cooling jackets 6A and 8A therearound for protection from the high-temperature exhaust gas. The hood 8 is provided in the center of its interior with a tubular diffuser 18 to cause the exhaust gas to flow downward over the entire inner periphery of the hood 8 as shown in FIG. 2.

A charging bucket 19 has a suspender arm 20 pivoted to its body and openable bottom means 21 of the clamshell type at its lower portion.

According to this invention, the bucket 19 has the structure shown in FIGS. 2 to 5 and FIG. 7 so as to be serviceable as a preheating chamber.

The bucket main body is cylindrical as shown in FIGS. 3 and 4 and is provided with a water-cooling jacket 22 therearound. Twelve channel forming members 23 attached to the inner peripheral wall of the bucket main body are equidistantly arranged circumferentially thereof and extend longitudinally of the bucket. The channel forming members 23 are in the form of a rib triangular in cross section. The members 23 form channels 24 extending through the bucket main body from a portion thereof slightly below its upper end to its lower end. Each of the members 23 has ports 25 arranged at specified spacing longitudinally of the channel 24 and extending obliquely downward. The bucket main body has such a diameter that the hood 8 is seated thereon as seen in FIG. 2. Alternatively the hood 8 may be fitted in the bucket main body. Instead of being triangular in section as illustrated, the channel forming members 23 may be semi-circular insofar as they cause the exhaust gas to flow along the inner-peripheral wall of the bucket and then radially inwardly of the bucket while assuring the flow of the gas over the entire length of the cylindrical bucket. The channel forming members 23 may be arranged circumferentially of the bucket at any desired spacing, provided that they define a channel 26 between each two adjacent members 23.

The bottom means 21, as seen in greater detail in FIG. 3, comprises a pair of bottom plates 28 pivoted to the bucket main body as at 29 and having upwardly extending plates 27 surrounding a lower peripheral portion of the bucket main body. The bottom plates 28 are provided with chains 30, which, when raised, open the bottom plates 28 as indicated in broken lines in FIG. 3. The pair of bottom plates 28 are provided with unillustrated means by which they are held closed. Accordingly the chains 30 are pulled up against this means to open the bottom plates 28.

The illustrated embodiment includes two preheating pits 31 which are arranged on the opposite sides of the combustion chamber 1 as angularly displaced from each other by 180 degrees. As shown in FIGS. 2 and 6, the preheating pit 31 has a support 32 adapted to place the bottom means 21 of the bucket 19 thereon and partitioning the interior of the pit 31. The support 32 extends upwardly outward radially thereof in the form of a bowl to support the bottom means 21 in a closed state with stability to guide and position the bucket 19 concentrically with the pit when the bucket 19 is to be placed into the pit. The support 32 is formed with apertures 33 equidistantly arranged circumferentially thereof.

The top opening of the pit 31 is provided with a pair of openable lids 34 which have semi-circular cutout portions 35 opposed to each other for surrounding the outer periphery of the bucket as seen in FIG. 6. When the bucket 19 has been placed into the pit 31, the pair of lids 34 are slidingly closed, while the lids 34 are opened as indicated in broken lines in FIG. 6 before the bucket 19 is removed. The lids 34 have sealing means where they contact the pit and the bucket 19 to seal off the interior of the pit.

With reference to FIGS. 1 and 2, the pit has a duct 36 and a connecting duct 37 with an openable switch damper 38 interposed between the ducts 36 and 37. The pit duct 36 extends outward from a body portion of the pit 31, while the connecting duct 37 is in communication with the water-cooled duct 2. The damper 38 is hydraulically openable and closable. The damper 38 and ducts 36 and 37 each have a water-cooling means.

The operation of the present apparatus will be described below with reference to FIGS. 8 and 9 in the order of sequential steps.

With use of a crane 40 or the like, a jig 41 is set in the bucket 19 placed in a pit 39 as shown in FIG. 9 (a). The jig 41 is T-shaped and includes a horizontal bar 42 having a hook and a vertical bar 43 extending from the horizontal bar 42. The horizontal bar 42 of the jig 41 is placed on the upper ends of opposed channel forming members 23 in the bucket 19 to position the vertical bar 43 in the center of the bucket 19 as seen in FIG. 8 (a). With the jig 41 thus set in position, a material such as scrap 46 is placed in a specified amount into the bucket 19 by a dump truck 44 (FIG. 9 (b)) or a magnetic crane 45 (FIG. 8 (a)). At this time, pieces of the scrap 46 form spaces therebetween, while the channel forming members 23 provide the channels 26 shown in FIG. 7. Moreover, the members 23 serve as reinforcing ribs against the impact produced when the scrap is placed in.

After the specified amount of scrap 46 has been placed into the bucket, the jig 41 is withdrawn as by the crane 40 shown in FIG. 9 (c), whereby a vertical channel 47 is formed in the center of the bucket (FIG. 8 (b)).

Subsequently the bucket 19 accommodating the scrap is transferred from the pit 39 to the preheating pit 31 with use of the crane 40 as shown in FIG. 9 (d). The lids 34 are then closed, while the bypass duct 6 is turned about the shaft 10 by the assembly 5 shown in FIG. 1 to bring the hood 8 on the free end of the duct 6 to a position immediately above the bucket 19 in the preheating pit 31 (see FIG. 9 (e)). Subsequently the winch 15 of the lift assembly 13 shown in FIG. 1 is driven to lower the hood 8 to close the bucket 19 as seen in FIG. 2. The dampers 12 and 38 on the bypass circuit are both opened to start preheating. In the meantime, another bucket 19 is placed in the other preheating pit 31 as seen in FIG. 9 (f), and scrap is placed into this bucket in the manner shown in FIGS. 9 (a) to (c). With the preferred embodiment of the invention, three buckets are used.

Figure 7:
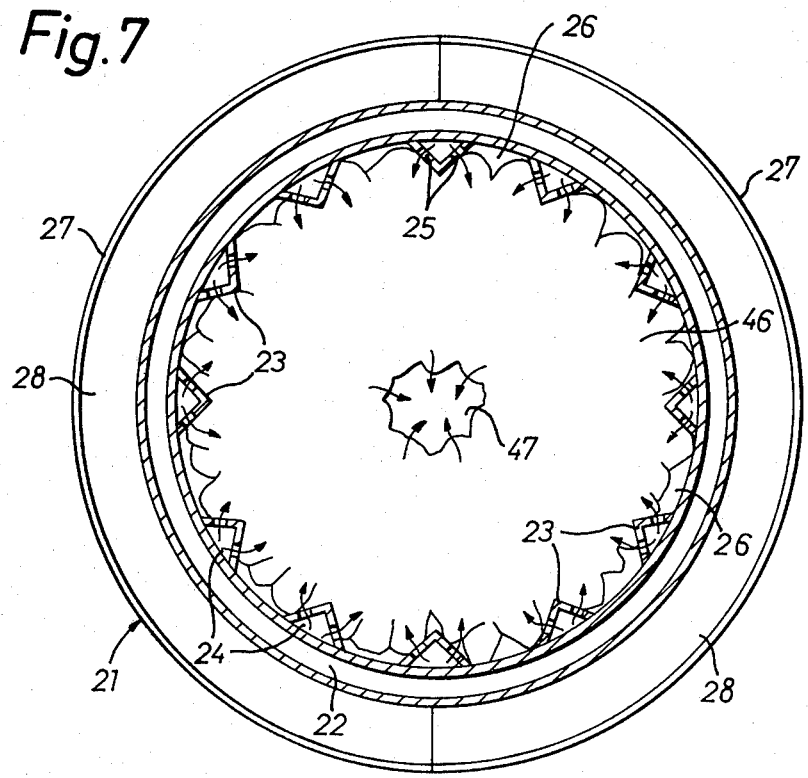
FIG. 7 is an enlarged view in section taken along the line 7—7 in FIG. 2.

The scrap in the bucket 19 is preheated with the flow of exhaust gas illustrated in FIGS. 2 and 7. The heat energy of the gas drawn off from the combustion chamber 1 through the outlet 7 is led through the bypass duct 6 to the hood 8, where the diffuser 18 spreads the flow of the gas over the entire upper portion of the bucket 19 as indicated by arrows in FIG. 2, permitting the heat energy of the gas to preheat the scrap 46 or like material in the bucket.

The channels 24 provided by the members 23, the downwardly slanting ports 25 and the channel 47 formed by the jig 41 within the bucket 19 assure uniform preheating of the scrap 46 in its entirety, while minimizing the pressure loss which is objectionable to the dust collector. The extreneous matter adhering to the scrap is burned out or evaporated off during the preheating. The waste gas from the preheating pit 31 is led through the pit duct 36 and connecting duct 37 to the water-cooled duct 2.

After the completion of the preheating of the scrap 46, the dampers 12 and 38 are closed, the hood 8 raised by the winch 15 of the lift assembly 13 shown in FIG. 1 and placed on the other bucket 19 already prepared by turning the bypass duct 6 by the assembly 5 as shown in FIG. 9 (g). The scrap is then preheated in the same manner as above.

On the other hand, the bucket 19 accommodating the preheated material shown in FIG. 9 (g) is transferred by the crane 40 to an electric furnace 48 shown in FIG. 9 (h). The bottom means 21 is opened to charge the material into the furnace. At this time, hot waste water at 40° to 50° C. from the furnace 48 may be supplied to the jacket 22 of the bucket 19 to warm up the material to be placed thereinto. With water completely removed from the material charged into the furnace, explosion accidents can be avoided. Current is then passed through the furnace to start melting as shown in FIG. 9 (i).

For reference, operation with use of the preheating apparatus of the invention will be compared with usual operation below.

STEEL MAKING EQUIPMENT

| | | |
|---|---|---|
| 1. | E.A.F. Capacity | |
| | a. Nominal: | 30 tons/charge |
| | b. Normal: | 42.5 tons/charge |
| | c. Maximum: | 43.5 tons/charge |
| 2. | E.A.F. Operation | |
| | a. Power on to tap: | 70 minutes |
| | b. Charge/2 shifts/day: | 13–14 charges |
| | c. Monthly production: | 13,000 tons |
| 3. | Scrap Bucket | |
| | a. Volume: | 30 M³ |
| | b. The number of unit: | 3 units |
| | c. Scrap bulk density: | 0.6 ton/m³ |
| 4. | Dust Collector | |
| | a. Volume of exhaust gas treated | 1500M³/min at 200° C. |
| | b. The number of Blower: | 2 blowers |
| | c. Motor capacity: | 200 × 2 |
| 5. | Preheating Apparatus | |
| | a. Temperature at inlet of preheating chamber: | 800° C. |
| | b. Volume of gas in preheating chamber | 1000 M³/min |
| | c. Preheating time (3 charges) | |
| | Initial charge | 15 min. |
| | Additional charge I | 10 min. |
| | Additional charge II | 10 min. |
| | d. Scrap preheating temperature: | 200–500° C. |

COMPARISON BETWEEN NORMAL OPERATION AND OPERATION WITH PREHEATING[1]

| Item | Normal Operation | Operation with Preheating | Difference |
|---|---|---|---|
| 1. Melting time (Power-on to melt-down) | 53 | 48 | −5 |
| 2. Refining time (Melt-down to tap) | 18 | 16 | −2 |
| 3. Power-on to tap | 1Hr.17 | 1Hr.10 | −7 |
| 4. Burner operation time (min/4 burners/charge) | 105 | 95 | −10 |
| 5. Lance Oxygen cutting time (min/2 lance/charge) | 45 | 37 | −8 |
| 6. Tapping yield (%) | 90 | 90.6 | +0.6 |
| 7. Electric power Consumption | | | |
| a. For melting only (KWH) | 12,000 | 11,000 | −1000 |
| b. For melting only (KWH/charge ton) | 282.4 | 258.9 | −23.5 |
| c. KWH/charge | 15,500 | 14,200 | −1300 |
| d. KWH/charge | 364.7 | 334.1 | −30.6 |
| 8. Oil consumption (for E.A.F.) | | | |
| a. Nm³/charge | 1,168 | 1026 | −142 |
| b. Nm³/charge ton | 27.5 | 24.1 | −3.4 |
| 9. Oil consumption (for E.A.F.) | | | |
| a. liter/charge | 302 | 277 | −25 |
| b. Liter/charge ton | 7.1 | 6.5 | −0.6 |
| 10. Electrode consumption (kg/charge ton) | 3.6 | 3.5 | −0.1 |

COMPARISON BETWEEN NORMAL OPERATION AND OPERATION WITH PREHEATING[2]

The following is the cost reduction based on Comparison[1]

1. Energy:
   (1) Electric power
   −30.6KWH/charge ton @0.05 (US$)    1.53 (US$/charge ton)
   (2) Oxygen
   −3.4Nm³/charge ton @0.21 (US$)    0.71 (US$/charge ton)
   (3) Oil
   −0.6 liter/charge ton @0.16 (US$)    0.10 (US$/charge ton)
   Total    2.34 (US$/charge ton)
2. Electrode
   −0.1 kg/charge ton @2,368.42 (US$)    0.24 (US$/charge ton)
3. Other cost reduction due to production increase through reduction in melting time.

[1]Bricks, consumbales, labor cost    0.53 (US$/charge ton)
[2]Overhead costs    0.53 (US$/charge ton)
    TOTAL : 1.+ 2. + 3. = 3.64 US$/charge ton Therefore, cost reduction per month is (Production—13,000 ton/month, Tapping yield—90.6%) 14,348 charge ton/month × 3.64 US$/charge ton = 52,226.72 US$/month. If tapping yield is taken into consideration, cost reduction per month is US$47,317.41

Although this invention has been described above with reference to the illustrated preferred embodiments, the apparatus can be modified as follows.

The bypass duct 6 which is connected to a top portion of the combustion chamber for drawing off the exhaust gas therefrom in the above embodiment may be attached to a suitable portion on the side wall of the combustion chamber 1. Since the hood 8 on the bypass duct 6 needs only to be shiftable to the position of one of a plurality of the preheating pits 31, the duct 6 may be attached to a suitable side portion of the combustion chamber 1 and made extendable or collapsible instead of using the turning assembly 5 and lift assembly 13 described above. However, it will be apparent from the foregoing description that the use of such turning assembly 5 and lift assembly 13 is most preferable to render the hood 8 on the duct 6 so shiftable as stated above.

What is claimed is:

1. An apparatus for preheating the material to be charged into a steel making furnace with the heat energy of exhaust gas from a dust collecting combustion chamber for the furnace, the apparatus comprising a plurality of preheating pits each communicating with an outlet duct of the combustion chamber; a charging bucket removably positioned in each of the preheating pits wherein a clearance for the passage of an exhaust gas is provided between the bucket and the inner wall of the preheating pit; coupling means coupling the preheating pits to the outlet duct of the combustion chamber; the charging bucket having exhaust gas passage means in the interior thereof for distributing the heated exhaust gas throughout the charging bucket, the charging bucket having openable bottom means at the bottom thereof; and a transfer duct having a hood at one end thereof, the other end of the transfer duct communicating with the combustion chamber, and wherein the hood on the transfer duct is selectively shiftable to a position covering the top of the charging bucket placed in one of the preheating pits, thereby closing the bucket whereby the exhaust gas from the combustion chamber is passed through the transfer duct and the hood into the exhaust gas passage means in the charging bucket to preheat material therein and thereafter flows through the clearance and the coupling means to the outlet duct of the combustion chamber.

2. A preheating apparatus as defined in claim 1 wherein the transfer duct is connected to the top wall of the combustion chamber in communication therewith, the preheating apparatus including means for selectively shifting the hood to a position on top of one of the preheating pits, the shifting means comprising an assembly for turning the transfer duct about the connection between the transfer duct and the top wall and an assembly for raising or lowering the hood relative to the transfer duct.

3. A preheating apparatus as defined in claim 1 wherein the hood, the transfer duct and the outlet duct each include water cooling means, and the charging bucket includes a water-cooling jacket and wherein the openable bottom means of the bucket is a clamshell structure whereby the charging bucket functions as a preheating chamber.

4. A preheating apparatus as defined in claim 1 wherein the exhaust gas passage means comprises a plurality of channels circumferentially equidistantly arranged along the inner periphery of the bucket and extending vertically through the bucket, each channel including ports permitting the channel to communicate with the interior of the bucket radially inwardly thereof; and a passageway to be formed vertically in the center of the bucket.

5. A preheating apparatus as defined in claim 1 wherein the hood includes a diffuser for diffusing the heat energy of the exhaust gas through the whole interior space of the bucket placed in the preheating pit after the gas has been introduced to the hood through the transfer duct.

6. A preheating apparatus as defined in claim 1 including an adjustable damper in the transfer duct and the outlet duct.

7. A preheating apparatus as defined in claim 1 wherein the preheating pit is open at its top, and the charging bucket is positioned in the pit through the top opening, the top opening being provided with closable pit lids for preventing entry of atmospheric air when the material in the bucket is preheated.

* * * * *